(12) United States Patent
Sugii et al.

(10) Patent No.: US 9,105,947 B2
(45) Date of Patent: Aug. 11, 2015

(54) HYDROGEN STORAGE ALLOY FOR ALKALINE STORAGE BATTERY, AND ALKALINE STORAGE BATTERY AND ALKALINE STORAGE BATTERY SYSTEM EACH INCLUDING NEGATIVE ELECTRODE HAVING THE ALLOY

(75) Inventors: Hiromasa Sugii, Tokushima (JP); Makoto Ochi, Tokushima (JP); Shuuhei Yoshida, Naruto (JP); Yoshinobu Katayama, Naruto (JP); Kazuhiro Kitaoka, Naruto (JP); Masao Takee, Tokushima (JP)

(73) Assignee: SANYO Electric Co., Ltd., Osaka (JP)

( * ) Notice: Subject to any disclaimer, the term of this patent is extended or adjusted under 35 U.S.C. 154(b) by 1135 days.

(21) Appl. No.: 13/051,493

(22) Filed: Mar. 18, 2011

(65) Prior Publication Data

US 2011/0229755 A1    Sep. 22, 2011

(30) Foreign Application Priority Data

Mar. 18, 2010 (JP) ................................. 2010-062662
Jan. 28, 2011 (JP) ................................. 2011-016242

(51) Int. Cl.

| C22C 19/03 | (2006.01) |
|---|---|
| H01M 4/42 | (2006.01) |
| H01M 4/46 | (2006.01) |
| H01M 10/34 | (2006.01) |
| H01M 4/38 | (2006.01) |
| C01B 3/00 | (2006.01) |
| C01B 6/24 | (2006.01) |
| H01M 10/44 | (2006.01) |

(52) U.S. Cl.
CPC ........... *H01M 10/345* (2013.01); *C01B 3/0057* (2013.01); *C22C 19/03* (2013.01); *H01M 4/383* (2013.01); *C01B 6/24* (2013.01); *H01M 10/44* (2013.01); *Y02E 60/124* (2013.01); *Y02E 60/327* (2013.01)

(58) Field of Classification Search
None
See application file for complete search history.

(56) References Cited

U.S. PATENT DOCUMENTS

| 5,085,944 A * | 2/1992 | Ebato et al. .................. 428/570 |
| 2007/0072079 A1 | 3/2007 | Yasuoka et al. |
| 2009/0061316 A1 | 3/2009 | Yoshida et al. |
| 2009/0226342 A1 | 9/2009 | Kanemoto et al. |
| 2011/0274972 A1* | 11/2011 | Kanemoto et al. ............ 429/219 |

FOREIGN PATENT DOCUMENTS

| CN | 1941463 A | 4/2007 |
| CN | 101378123 A | 3/2009 |
| WO | 2007/018292 A1 | 2/2007 |

OTHER PUBLICATIONS

Office Action dated Sep. 11, 2014, issued in corresponding Chinese Patent Application No. 201110064986.5, with English Translation (6 pages).

* cited by examiner

*Primary Examiner* — Wayne Langel
(74) *Attorney, Agent, or Firm* — Westerman, Hattori, Daniels & Adrian, LLP

(57) ABSTRACT

To provide a hydrogen storage alloy for an alkaline storage battery that improves output power by pulverization of the alloy in the initial stage of partial charge and discharge cycles and that maintains its surface condition to improve the amount of lifetime work (Wh), and an alkaline storage battery and battery system. A hydrogen storage alloy for an alkaline storage battery includes a composition expressed by $La_xRe_yMg_{1-x-y}Ni_{n-m-v}Al_mT_v$ (Re: rare earth element(s) including Y; T: Co, Mn, Zn; $0.17 \leq x \leq 0.64$, $3.5 \leq n \leq 3.8$, $0.06 \leq m \leq 0.22$, $v \geq 0$), and a main phase of an $A_5B_{19}$ type crystal structure. A ratio of X/Y of the concentration ratio X of Al to Ni in a surface layer and the concentration ratio Y of Al to Ni in a bulk layer is $0.36 \leq X/Y \leq 0.85$. An alkaline storage battery includes the hydrogen storage alloy in its negative electrode. An alkaline storage battery system performs partial charge and discharge control.

6 Claims, 3 Drawing Sheets

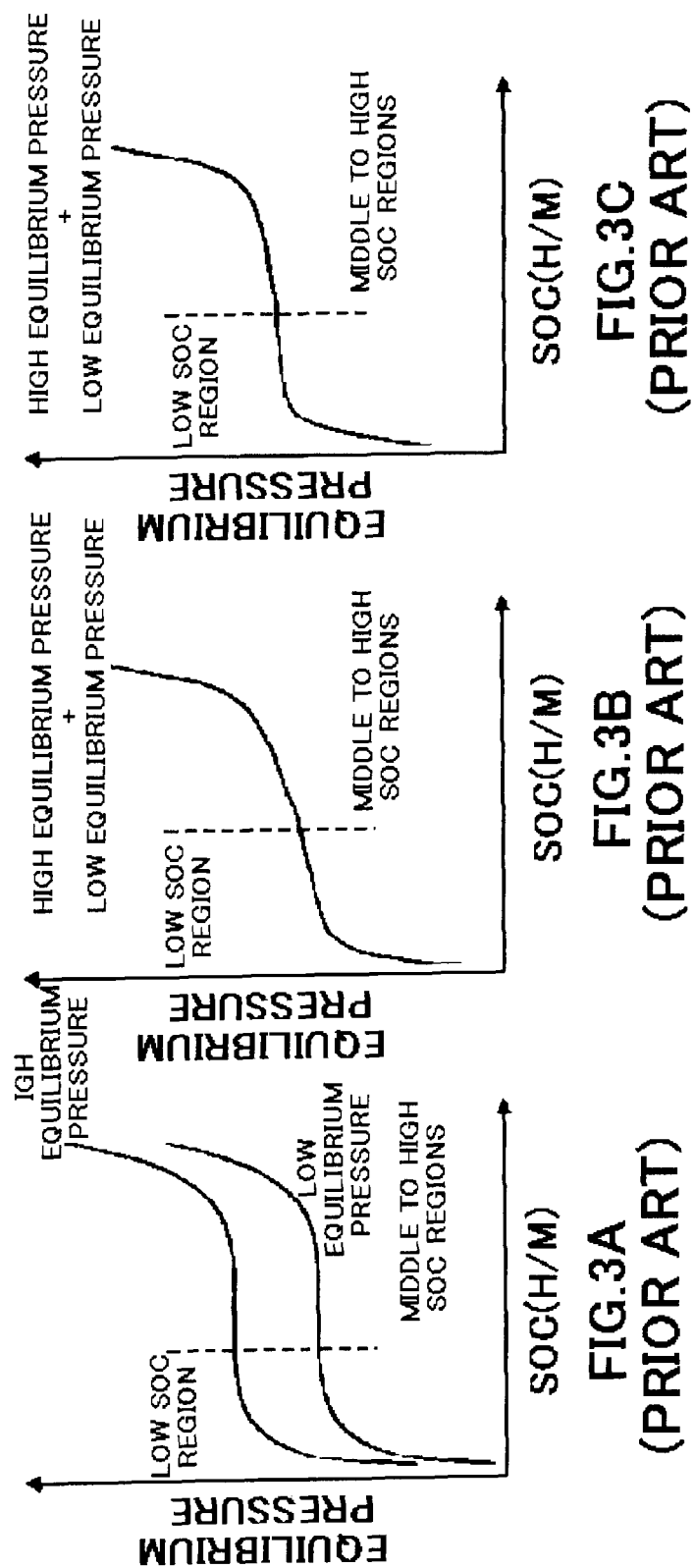

HYDROGEN STORAGE ALLOY FOR ALKALINE STORAGE BATTERY, AND ALKALINE STORAGE BATTERY AND ALKALINE STORAGE BATTERY SYSTEM EACH INCLUDING NEGATIVE ELECTRODE HAVING THE ALLOY

TECHNICAL FIELD

The present invention relates to a hydrogen storage alloy for an alkaline storage battery that is suited for applications requiring high current discharge (high power applications), such as hybrid electric vehicles (HEVs) and pure electric vehicles (PEVs), and also relates to an alkaline storage battery and an alkaline storage battery system. In particular, the invention relates to an alkaline storage battery that includes an electrode group composed of a negative electrode including negative electrode active material of a hydrogen storage alloy, a nickel positive electrode, and a separator and housed in an outer can together with an alkaline electrolyte, and also relates to an alkaline storage battery system that employs this alkaline storage battery.

BACKGROUND ART

An alkaline storage battery using a hydrogen storage alloy as the negative electrode has excellent safety and is therefore used for high power applications such as HEVs and PEVs. The hydrogen storage alloy used for such application is commonly composed of a single-phase $AB_2$ type structure or $AB_5$ type structure. However, recently, the hydrogen storage alloy has been required to have much higher power or much higher capacity performance than the conventional range. Accordingly, a hydrogen storage alloy including as the main phase an $A_2B_7$ type structure or $A_5B_{19}$ type structure in which an $AB_2$ type structure and $AB_5$ type structure are combined, such as a rare earth-Mg—Ni-based alloy has been proposed (see International Publication WO 2007/018292).

The crystal structure of the rare earth-Mg—Ni-based hydrogen storage alloy is transformed based on its stoichiometric ratio. That is, when the stoichiometric ratio is increased, the $A_5B_{19}$ type structure becomes dominant from the $A_2B_7$ type structure.

Because the $A_5B_{19}$ type structure has a periodically stacked structure including one layer of the $AB_2$ type structure and three layers of the $AB_5$ type structure, the nickel ratio per unit crystal lattice can be improved. Therefore, an alkaline storage battery using the rare earth-Mg—Ni-based hydrogen storage alloy that contains (a relatively large amount of) the $A_5B_{19}$ type structure as the main phase shows particularly excellent high power characteristics.

On the other hand, the high power application for HEVs, for example, commonly employs a partial charge-discharge control system in which pulse charge and discharge are repeated, for example, in the range of a state of charge (SOC) from 20 to 80%. Accordingly, in the high power application for HEVs, for example, the alkaline storage battery to be used is required to have excellent output characteristics as well as output characteristics with small variation associated with SOC variation (excellent output power stability).

Generally, the output characteristics of the alkaline storage battery containing the hydrogen storage alloy in its negative electrode closely relates to the equilibrium pressure of the hydrogen storage alloy. Specifically, the output characteristics tends to be high when the hydrogen storage alloy has a high equilibrium pressure, and the output characteristics tends to be low when the hydrogen storage alloy has a low equilibrium pressure. Consequently, when the equilibrium pressure of the hydrogen storage alloy varies associated with the SOC variation, the output characteristics vary. When the output characteristics vary associated with the SOC variation, a predetermined output power cannot be obtained in a certain SOC range. Thus, the variation of the output characteristics associated with the SOC variation is not preferable for the high power application for HEVs, for example, that requires a constant output power over from low SOC to high SOC.

Therefore, in order to reduce the variation of the output characteristics associated with the SOC variation, it is necessary to control the hydrogen storage alloy so that the equilibrium pressure varies in a small range associated with the SOC variation. That is, it is necessary to control the hydrogen storage alloy so that the variation of the equilibrium pressure is reduced in a plateau region of a PCT curve of the hydrogen storage alloy (a region typically observed in the range of an SOC of 20 to 80%, where the equilibrium pressure of the hydrogen storage alloy does not largely vary associated with the SOC variation) corresponding to a practical region.

In particular, when a rare earth-Mg—Ni-based hydrogen storage alloy having the $A_5B_{19}$ type structure as the main phase is used in order to obtain high output characteristics, because the crystal structure of the hydrogen storage alloy has poor stability, subphases such as an $A_2B_7$ type structure, $AB_5$ type structure, and $AB_3$ type structure are readily generated. Thus, the alloy has the problem that such subphases reduce the flatness in the plateau region of the PCT curve of the hydrogen storage alloy to reduce the output power stability. Therefore, when the hydrogen storage alloy is used, it should be noted that the alloy is controlled so that the variation of the equilibrium pressure in the plateau region of the PCT curve would be reduced.

Meanwhile, the reason why the subphases reduce the flatness in the plateau region of the PCT curve of the used hydrogen storage alloy as discussed above is considered as follows. Generally, when the hydrogen storage alloy is composed of a plurality of crystal structures, the PCT curve of the hydrogen storage alloy is a mixture (see FIG. 3B) of the PCT curve of each crystal structure (see FIG. 3A). However, the PCT curves are not equally mixed in all SOC regions, and mixed differently between in a low SOC region and middle to high SOC regions, and thus the finally obtained PCT curve has a tilted plateau region (see FIG. 3B).

This means that a crystal structure having a low equilibrium pressure dominantly relates to hydrogen absorption and desorption in a low SOC region and, on the other hand, a crystal structure having a high equilibrium pressure dominantly relates to the hydrogen absorption and desorption in middle to high SOC regions. Thus, it is considered that the PCT curves of the hydrogen storage alloy are mixed in the low SOC region so as to shift to the PCT curve of the crystal structure having a low equilibrium pressure and, on the other hand, the PCT curves of the hydrogen storage alloy are mixed in the high SOC region so as to shift to the PCT curve of the crystal structure having a high equilibrium pressure.

The PCT curve of each crystal structure is mixed as described above and, as a result, the plateau region of the PCT curve of the hydrogen storage alloy is tilted to have poor flatness. Therefore, it is considered that an alkaline storage battery using such a hydrogen storage alloy has a large variation in the output characteristics associated with the SOC variation to reduce the stability of the output characteristics.

Recent studies have revealed that the problem that flatness is reduced in the plateau region of the PCT curve of a rare earth-Mg—Ni-based hydrogen storage alloy to reduce the output power stability is substantially caused when the rare earth-Mg—Ni-based hydrogen storage alloy contains a large amount of La in the rare earth portion and a small amount of Al in the Ni portion. It has been also revealed that such problem can be solved by increasing the amounts of Al and the like contained in the Ni portion in the rare earth-Mg—Ni-based hydrogen storage alloy to improve the stability of the output characteristics.

In other words, the structure ratio of the $AB_3$ type structure, $AB_5$ type structure, and $A_2B_7$ type structure as the subphases that cause poor flatness in the plateau region of the PCT curve is controlled to be in a predetermined range. Therefore, as shown in FIG. 3C, the plateau region of the PCT curve of the hydrogen storage alloy has a small slope and high flatness, and thus it has become clear that the hydrogen storage alloy has enhanced stability of the output characteristics.

However, the Al contained in a rare earth-Mg—Ni-based hydrogen storage alloy has a standard electrode potential lower than that of Ni, and thus it suffers from the problem of easy elution in an aqueous alkali solution. Hence, a new problem has occurred when a rare earth-Mg—Ni-based hydrogen storage alloy having an increased amount of Al is used to compose an alkaline storage battery. That is, Al is eluted from the rare earth-Mg—Ni-based hydrogen storage alloy into an alkaline electrolyte during charging and discharging and moves to the positive electrode to break into positive electrode active material, and as a result, the alkaline storage battery has a reduced durability (output power durability).

Therefore, the inventors of the present invention have developed a rare earth-Mg—Ni-based hydrogen storage alloy suitable for producing an alkaline storage battery having excellent stability of the output characteristics and excellent durability and a hydrogen storage alloy electrode using the alloy for an alkaline storage battery in Japanese Patent Application 2009-210403.

It is considered that an alkaline storage battery including the hydrogen storage alloy developed in Japanese Patent Application 2009-210403 has excellent discharge performance and corrosion resistance resulting from pulverization of the hydrogen storage alloy in the initial stage of partial charge and discharge cycles. In a partial charge and discharge cycle test, a partial charge and discharge cycle is repeated at 45° C. for 6000 hours corresponding to a travel distance of 150,000 km or more or a travel time of 10 years or more of a vehicle (a partial charge and discharge cycle test for a discharge time of 3000 hours).

However, the partial charge and discharge cycle test simulating HEV control (the test repeating the cycle that discharging is stopped and charging is started when the voltage reaches an SOC of 20%, and the charging is stopped and the discharging is started when the voltage reaches an SOC of 80%) is performed to study battery durability, and as a result, it has been revealed that the battery has a problem of reduced total discharge power time (Wh: hereinafter referred to as amount of lifetime work (Wh)) that is the sum (integrated value) of the products of discharge power (W) and discharge time (h). This is thought to be because the surface of the hydrogen storage alloy is activated to improve the output power with the progress of the pulverization of the hydrogen storage alloy in the initial stage of the partial charge and discharge cycles, but associated with the progress of the partial charge and discharge cycles, the oxidation of the surface of the hydrogen storage alloy proceeds to reduce the active surface, and consequently the amount of lifetime work is reduced.

SUMMARY

An advantage of some aspects of the invention is to provide a hydrogen storage alloy for an alkaline storage battery that improves output power by pulverization of the hydrogen storage alloy in the initial stage of partial charge and discharge cycles and that maintains a surface condition of the alloy to greatly improve the amount of lifetime work (Wh), and an alkaline storage battery and an alkaline storage battery system each including a negative electrode using the alloy.

According to an aspect of the invention, a hydrogen storage alloy for an alkaline storage battery includes a composition expressed by $La_xRe_yMg_{1-x-y}Ni_{n-m-v}Al_mT_v$ (where Re is at least one element selected from among rare earth elements including Y (other than La), T is at least one element selected from among Co, Mn, and Zn, $0.17 \leq x \leq 0.64$, $3.5 \leq n \leq 3.8$, $0.06 \leq m \leq 0.22$, and $v \geq 0$), and a main phase of an $A_5B_{19}$ type crystal structure. A ratio of X/Y of the concentration ratio X (Al/Ni) (%) of aluminum (Al) to nickel (Ni) in a surface layer and the concentration ratio Y (Al/Ni) (%) of aluminum (Al) to nickel (Ni) in a bulk layer is 0.36 or more and 0.85 or less ($0.36 \leq X/Y \leq 0.85$).

According to another aspect of the invention, an alkaline storage battery includes an electrode group including a hydrogen storage alloy negative electrode including negative electrode active material of the hydrogen storage alloy described above, a nickel positive electrode including positive electrode active material mainly containing nickel hydroxide, and a separator; an alkaline electrolyte; and an outer can housing the electrode group and the alkaline electrolyte. The hydrogen storage alloy negative electrode retains the alkaline electrolyte in a retention amount (Z1) of 95 mg or more and 125 mg or less (95 mg $\leq$ Z1 $\leq$ 125 mg) per gram of the hydrogen storage alloy. In the alkaline storage battery according to this aspect of the invention, it is preferable that the separator retain the alkaline electrolyte in a retention amount (P1) of 660 mg or more and 1160 mg or less (660 mg $\leq$ P1 $\leq$ 1160 mg) per gram of the separator.

In the alkaline storage battery according to the present aspect of the invention, it is preferable that the hydrogen storage alloy negative electrode retain the alkaline electrolyte in a retention amount (Z2) of 65 mg or more per gram of the hydrogen storage alloy after discharge for 3000 hours in partial charge and discharge cycles. It is preferable that the separator retain the alkaline electrolyte in a retention amount (P2) of 370 mg or more per gram of the separator after discharge for 3000 hours in partial charge and discharge cycles.

As an example of the hydrogen storage alloy according to these aspects of the present invention, if an alloy is expressed by the composition formula above, each of x, n, and m is within the value range, and the main phase has an $A_5B_{19}$ type crystal structure, the component ratio of subphases such as an $AB_3$ type structure, $AB_5$ type structure, and $A_2B_7$ type structure that reduce the flatness in a plateau region of a PCT curve is controlled in a predetermined range. Thus, the plateau region of the PCT curve of the hydrogen storage alloy has a small slope and high flatness, and therefore a hydrogen storage alloy for an alkaline storage battery obtains excellent stability of the output characteristics.

In this case, if the ratio X/Y of the concentration ratio X (Al/Ni) (%) of aluminum (Al) to nickel (Ni) in a surface layer and the concentration ratio Y (Al/Ni) (%) of aluminum (Al) to nickel (Ni) in a bulk layer is 0.36 or more and 0.85 or less ($0.36 \leq X/Y \leq 0.85$), the surface layer has a lower Al concentration than that in the bulk layer. Hence, an alkaline storage battery using the hydrogen storage alloy according to the aspect of the invention reduces a trouble that Al is eluted from the hydrogen storage alloy into an alkaline electrolyte and moves to the positive electrode to break into positive electrode active material, and as a result, durability of the alkaline storage battery is reduced.

The surface layer of the hydrogen storage alloy means the region showing a different form from that of the bulk layer (they are distinguished by their brightness under transmission electron microscopic observation on a cross-section of the hydrogen storage alloy powder). The surface layer is also the region from the surface of a hydrogen storage alloy to the depth where an alkaline electrolyte can be impregnated in an alkaline storage battery. Commonly, a hydrogen storage alloy for an alkaline storage battery has a surface layer having a thickness of about 100 nm. Thus, a reduced concentration of Al contained in the region can effectively suppress the elution of Al from the hydrogen storage alloy into an alkaline electrolyte.

In this case, it is revealed that the total discharge power time (amount of lifetime work: Wh) is greatly improved when the hydrogen storage alloy negative electrode is controlled to retain the alkaline electrolyte in a retention amount (Z1) of 95 mg or more and 125 mg or less (95 mg≤Z1≤125 mg) per gram of the hydrogen storage alloy before partial charge and discharge cycles (before use). This is thought to be because the control of the hydrogen storage alloy negative electrode to retain the alkaline electrolyte in the predetermined retention amount (Z1) before partial charge and discharge cycles (before use) makes an alkaline electrolyte always present on the surface of the hydrogen storage alloy. If the alkaline electrolyte is always present on the surface of the hydrogen storage alloy in this manner, it is supposed that the progress of oxidation on the alloy surface is suppressed after the progress of the pulverization in the initial stage of partial charge and discharge cycles, and thus the total discharge power time (amount of lifetime work: Wh) is increased. In order to achieve a state where the alkaline electrolyte is always present on the surface of the hydrogen storage alloy as mentioned above, a separator preferably retains the alkaline electrolyte in a retention amount (P1) of 660 mg or more and 1160 mg or less (660 mg≤P1≤1160 mg) per gram of the separator before partial charge and discharge cycles.

After 6000 hours in the partial charge and discharge cycles (a discharge time of 3000 hours), the hydrogen storage alloy negative electrode preferably retains the alkaline electrolyte in a retention amount (Z2) of 65 mg or more (65 mg≤Z2) per gram of the hydrogen storage alloy.

After discharge for 3000 hours in the partial charge and discharge cycles, the separator preferably retains the alkaline electrolyte in a retention amount (P2) of 370 mg or more (370 mg≤P2) per gram of the separator.

In an alkaline storage battery system composed of a hydrogen storage alloy negative electrode including the hydrogen storage alloy according to any of the above-described aspects of the invention, it is preferable that charging and discharging be optionally controlled by a partial charge-discharge control apparatus only within a state of charge (SOC) from 20 to 80%. In the alkaline storage battery system, it is preferable that the partial charge-discharge control apparatus stops the discharging and starts the charging when the voltage reaches an SOC of 20%, and the partial charge-discharge control apparatus stops the charging and start the discharging when the voltage reaches an SOC of 80%.

In the invention, the progress of pulverization of the hydrogen storage alloy in the initial stage of partial charge and discharge cycles improves the output power in the initial stage of partial charge and discharge cycles, and the pulverized state can be suitably maintained. As a result, the total discharge power time (amount of lifetime work: Wh) can be greatly increased after 6000 hours in the partial charge and discharge cycles (a discharge time of 3000 hours).

BRIEF DESCRIPTION OF THE DRAWINGS

The invention will be described with reference to the accompanying drawings, wherein like numbers reference like elements.

FIGS. 3A to 3C are charts illustrating a PCT curve of a hydrogen storage alloy.

DESCRIPTION OF EXEMPLARY EMBODIMENTS

Figure 1:
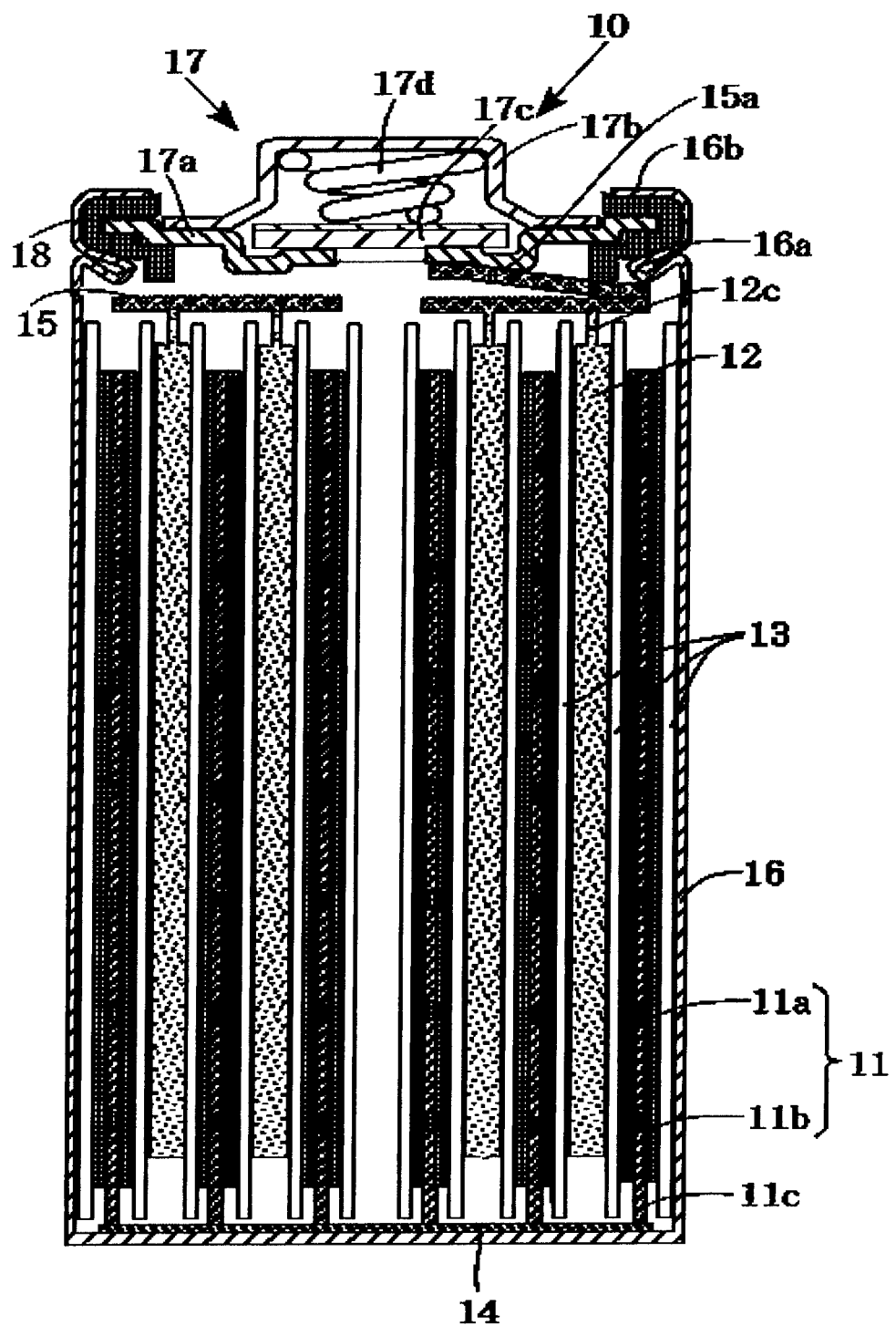
FIG. 1 is a schematic sectional view showing an embodiment of the alkaline storage battery in the invention.

Next, exemplary embodiments of the invention will now be described in detail below. However, it should be understood that the invention is not limited to the embodiments, and various changes and modifications may be made in the invention as appropriate, without departing from the spirit and scope thereof.

1. Hydrogen Storage Alloy

A hydrogen storage alloy was prepared as follows. In this case, lanthanum (La), samarium (Sm), neodymium (Nd), magnesium (Mg), nickel (Ni), aluminum (Al), and cobalt (Co) were firstly mixed in a predetermined molar ratio. The mixture was melted in an argon gas atmosphere, and then the melted mixture was quenched to prepare each ingot of hydrogen storage alloys α, β, γ, and δ having a composition expressed by $La_xRe_yMg_{1-x-y}Ni_{n-m-v}Al_mT_v$ (where Re is at least one element selected from among rare earth elements including Y (other than La), and T is at least one element selected from among Co, Mn, and Zn).

The composition analyses of the hydrogen storage alloys α, β, γ, and δ by inductively coupled plasma emission spectrometry (ICP) revealed that, as shown in Table 1, the hydrogen storage alloy α had a composition expressed by $La_{0.3}Sm_{0.5}Mg_{0.2}Ni_{3.2}Al_{0.25}$, that the hydrogen storage alloy β had a composition expressed by $La_{0.6}Sm_{0.2}Mg_{0.2}Ni_{3.6}Al_{0.15}$, that the hydrogen storage alloy γ had a composition expressed by $La_{0.2}Nd_{0.7}Mg_{0.1}Ni_{3.6}Al_{0.10}Co_{0.05}$, and that the hydrogen storage alloy δ had a composition expressed by $La_{0.6}Sm_{0.2}Mg_{0.2}Ni_{3.6}Al_{0.06}$.

Table 1 also shows the molar ratio (B/A=n) of Component B (Ni, Al, and T) to Component A (rare earth elements (La and Re) and Mg), the molar ratio (x) of La, the molar ratio (m) of Al, and the molar ratio of T (v) when each of the hydrogen storage alloys α, β, γ, and δ is expressed by the composition formula $La_xRe_yMg_{1-x-y}Ni_{n-m-v}Al_mT_v$.

Next, the respective melting points (Tm) of the obtained hydrogen storage alloys α, β, γ, and δ were determined using a differential scanning calorimeter (DSC). Then, the hydrogen storage alloys α, β, γ, and δ were heat-treated at temperatures (Ta=Tm−50° C.) that were 50° C. lower than the respective melting points (Tm) for a predetermined period (10 hours in this example). Subsequently, each of the hydrogen storage alloy ingots was roughly crushed, and then mechanically pulverized under an inert gas atmosphere to prepare hydrogen storage alloy powders each having a particle diameter of volume cumulative frequency 50% (D50) of 25 μm.

Next, by powder X-ray diffractometry using an X-ray diffractometer with a Cu—Kα tube as the X-ray source, each crystal structure of the hydrogen storage alloy powders α, β, γ, and δ was determined. Here, the X-ray diffraction measurement was carried out at a scan speed of 1°/min, a tube voltage of 40 kV, a tube current of 300 mA, a scan step of 1°, and a measuring angle of 20 to 50 θ/deg. For calculating each crystal structure ratio, the $A_5B_{19}$ type structure was regarded as the $Pr_5Co_{19}$ type structure and $Sm_5Co_{19}$ type structure, and the $A_2B_7$ type structure was regarded as the $Ce_2Ni_7$ type structure and $Gd_2Co_{19}$ type structure. Then, each structure ratio was calculated by comparing each maximum intensity between 42 and 44° of the obtained profile with each diffraction peak intensity in the database of National Institute for Material Science (NIMS). The crystal structures of the main phases thus obtained are listed in Table 1.

2. Surface Treatment of Hydrogen Storage Alloy

Each powder of the hydrogen storage alloys α, β, γ, and δ prepared as above was used for surface treatment as below. In this case, each powder of the hydrogen storage alloys α, β, γ, and δ was firstly sealed in an SUS container, and then disodium hydrogen phosphate dodecahydrate having a concentration of 0.30% by mass was poured so as to have a concentration of $1.0 \times 10^{-1}$% by mass with respect to each mass of the hydrogen storage alloys α, β, γ, and δ. Then, the container was shaken and then left for 3 days to perform surface treatment on each of the hydrogen storage alloys α, β, γ, and δ.

Next, the obtained surface-treated powder of hydrogen storage alloy was dispersed and fixed between dummy substrates, and cut down and polished to form a cross section of the hydrogen storage alloy powder for analysis. Then, the cross section of the hydrogen storage alloy powder for analysis was observed under a transmission electron microscope (JEM-2010F field emission transmission electron microscope manufactured by JEOL Ltd., an acceleration voltage of 200 KV). The observation revealed that the surface layer region had a different form from that in the bulk layer region (their brightnesses were different) in each hydrogen storage alloy powder.

The surface layer region is a region in contact with an electrolyte, and the width (depth) from the particle surface was measured to be 100 nm. Furthermore, each composition of the surface layer and the bulk layer was analyzed with an energy dispersive X-ray spectrometer (UTW type Si (Li) semiconductor detector manufactured by Noran) to determine the intensity ratio X (%) of Al to Ni in the surface layer and the intensity ratio Y (%) of Al to Ni in the bulk layer, and then the ratio (X/Y) of the intensity ratio X (%) in the surface layer to the intensity ratio Y (%) in the bulk layer was calculated as listed in Table 1.

The results in Table 1 reveal that the hydrogen storage alloys β, γ, and δ having a composition expressed by $La_xRe_yMg_{1-x-y}Ni_{n-m-v}Al_mT_v$ (where Re is at least one element selected from among rare earth elements including Y (other than La), and T is at least one element selected from among Co, Mn, and Zn) and satisfying $0.17 \leq x \leq 0.64$, $3.5 \leq n \leq 3.8$, $0.06 \leq m \leq 0.22$, and $v \geq 0$ had a main phase of the $A_5B_{19}$ type structure.

Furthermore, it is revealed that the hydrogen storage alloys β, γ, and δ had a low Al content (m=0.15, m=0.10, or m=0.06, namely, $0.06 \leq m \leq 0.22$) and a ratio (X/Y) of the intensity ratio X (%) of Al in the surface layer to the intensity ratio Y (%) of Al in the bulk layer of 0.36 or more and 0.85 or less ($0.36 \leq X/Y \leq 0.85$). From the results, the surface layer had a lower Al concentration than that in the bulk layer. Therefore, such structure reduces the trouble that Al is eluted from the hydrogen storage alloy into an alkaline electrolyte and moves to the positive electrode to break into positive electrode active material, and as a result, the durability of the alkaline storage battery is reduced.

3. Hydrogen Storage Alloy Negative Electrode

A hydrogen storage alloy negative electrode 11 was prepared by filling a hydrogen storage alloy slurry into a negative electrode substrate 11a made from mild steel punching metal coated with nickel. In this case, each powder that was surface treated as described above of the hydrogen storage alloys α, β, γ, and δ was firstly mixed and kneaded with a water soluble binding agent, a thermoplastic elastomer, and a carbonaceous conductive material to prepare a hydrogen storage alloy slurry. The used water soluble binding agent included 0.1% by mass of carboxymethyl cellulose (CMC) and water (or pure water). Styrene butadiene rubber (SBR) was used as the thermoplastic elastomer. Ketjenblack was used as the carbonaceous conductive material.

Next, the hydrogen storage alloy slurry prepared as above was coated on the negative electrode substrate (mild steel punching metal coated with nickel) 11a, and dried so as to have a predetermined packing density (for example, 5.0 g/cm³) to form an active material layer 11b. Then, the substrate was rolled so as to have a predetermined thickness and cut into a predetermined size to prepare the hydrogen storage alloy negative electrode 11 (a, b, c, or d). In this case, the electrode prepared by using the powder of hydrogen storage alloy α was regarded as the hydrogen storage alloy negative electrode a. In a similar manner, the electrode prepared by using the powder of hydrogen storage alloy β was regarded as the hydrogen storage alloy negative electrode b, that by using the powder of hydrogen storage alloy γ was regarded as the hydrogen storage alloy negative electrode c, and that by using the powder of hydrogen storage alloy δ was regarded as the hydrogen storage alloy negative electrode d.

TABLE 1

| | Alloy composition (bulk layer) | | | | | Crystal structure of main phase | Al concentration ratio X/Y |
|---|---|---|---|---|---|---|---|
| | Composition formula $(La_xRe_yMg_{1-x-y}Ni_{n-m-v}Al_mT_v)$ | La(x) | Al(m) | T(v) | B/A(n) | | |
| α | $La_{0.3}Sm_{0.5}Mg_{0.2}Ni_{3.2}Al_{0.25}$ | 0.3 | 0.25 | None | 3.45 | $A_2B_7$ type | 0.29 |
| β | $La_{0.6}Sm_{0.2}Mg_{0.2}Ni_{3.6}Al_{0.15}$ | 0.6 | 0.15 | None | 3.75 | $A_5B_{19}$ type | 0.55 |
| γ | $La_{0.2}Nd_{0.7}Mg_{0.1}Ni_{3.6}Al_{0.10}Co_{0.05}$ | 0.2 | 0.10 | Co | 3.75 | $A_5B_{19}$ type | 0.70 |
| δ | $La_{0.6}Sm_{0.2}Mg_{0.2}Ni_{3.6}Al_{0.06}$ | 0.6 | 0.06 | None | 3.62 | $A_5B_{19}$ type | 0.85 |

4. Nickel Positive Electrode

A nickel positive electrode 12 was prepared by filling predetermined amounts of nickel hydroxide and zinc hydroxide into pores of a nickel sintered substrate serving as a substrate. In this case, for example, a nickel powder was firstly mixed and kneaded with methyl cellulose (MC) as a thickener, polymeric hollow microspheres (for example, microspheres having a pore size of 60 μm), and water to prepare a nickel slurry. Next, the nickel slurry was coated on both sides of a punching metal made from nickel-coated steel sheet, and then the coated punching metal was heated at 1000° C. in a reducing atmosphere for burning out the coated thickener and polymeric hollow microspheres and for sintering the nickel powder to prepare a nickel sintered substrate.

Next, the obtained nickel sintered substrate was immersed in an impregnation solution as described below, and then alkaline treatment with an alkaline treatment solution was repeated predetermined times to fill pores of the nickel sintered substrate with predetermined amounts of nickel hydroxide and zinc hydroxide. Then, the nickel sintered substrate was cut into a predetermined size to prepare the nickel positive electrode 12 filled with the positive electrode active material. In this case, the nickel positive electrode was prepared so that the ratio of the zinc mass of zinc hydroxide would be 7% by mass with respect to the nickel mass of nickel hydroxide to be the positive electrode active material.

The impregnation solution used was a solution in which nickel nitrate and zinc nitrate were adjusted to a predetermined molar ratio. The alkaline treatment solution used was an aqueous sodium hydroxide (NaOH) solution having a specific gravity of 1.3. In this case, an impregnation solution also containing cobalt nitrate, yttrium nitrate, ytterbium nitrate, or the like may be used, for example, in order to increase high temperature characteristics. Then, the nickel sintered substrate was immersed in the impregnation solution to impregnate the impregnation solution into pores of the nickel sintered substrate, and dried. Next, the substrate was immersed in the alkaline treatment solution for alkaline treatment. Consequently, the nickel salt and the zinc salt were converted into nickel hydroxide and zinc hydroxide. Then, the substrate was sufficiently washed with water to remove the alkaline solution, and then dried. Such series of operation for filling the positive electrode active material, that is, impregnation of the impregnation solution, drying, immersion into the alkaline treatment solution, water washing, and drying, was repeated 6 times to prepare the nickel positive electrode 12 that was the nickel sintered substrate filled with a predetermined amount of the positive electrode active material.

4. Nickel-Hydrogen Storage Battery

A nickel-hydrogen storage battery 10 was prepared as follows. In this case, first, the hydrogen storage alloy negative electrode 11 and the nickel positive electrode 12 each prepared as above were used, a separator 13 made of polyolefin nonwoven fabric having a weight of 55 g/m² was interposed therebetween, and the whole was rolled spirally to prepare a spiral electrode group. Here, on a lower part of the spiral electrode group prepared in this manner, a substrate exposed portion 11c of the hydrogen storage alloy negative electrode 11 is exposed, and on an upper part thereof, a substrate exposed portion 12c of the nickel positive electrode 12 is exposed. Next, to the substrate exposed portion 11c exposed on the lower end face of the obtained spiral electrode group, a negative electrode collector 14 was welded as well as, on the substrate exposed portion 12c of the nickel positive electrode 12 exposed on the upper end face of the spiral electrode group, a positive electrode collector 15 was welded to make an electrode assembly.

Next, the obtained electrode assembly was stored in a cylinder-shaped iron outer can 16 with a bottom coated with nickel (an outer surface of the bottom face was a negative electrode external terminal), and then, the negative electrode collector 14 was welded to an inner bottom face of the outer can 16. On the other hand, a collector lead part 15a led from the positive electrode collector 15 was welded to a sealing plate 17a that was a bottom part of a cover 17 also serving as a positive electrode terminal and having an insulating gasket 18 on a peripheral part thereof. Here, the cover 17 includes a positive electrode cap 17b, and in the positive electrode cap 17b, a pressure valve including a valve 17c that is deformed when reaching a predetermined pressure and a spring 17d are placed.

Next, an annular groove part 16a was formed on an upper peripheral part of the outer can 16, then, an electrolyte was poured, and the insulating gasket 18 installed on the peripheral part of the cover 17 was placed on the annular groove part 16a formed on the upper part of the outer can 16. Then, an open end 16b of the outer can 16 was crimped, and an alkaline electrolyte (a mixed aqueous solution of sodium hydroxide (NaOH), potassium hydroxide (KOH), and lithium hydroxide (LiOH)) was poured into the outer can 16 so as to have a predetermined amount (Z1 (mg)) per gram of the hydrogen storage alloy to prepare each of the D size nickel-hydrogen storage batteries 10 (A, B, C, D, E, F, G, H, and I) having a nominal capacity of 6 Ah.

In this case, the battery in which the hydrogen storage alloy negative electrode a was used and the electrolyte was poured so as to be 85 mg per gram of the hydrogen storage alloy was regarded as the battery A. The battery in which the hydrogen storage alloy negative electrode b was used and the electrolyte was poured so as to be 85 mg per gram of the hydrogen storage alloy was regarded as the battery B. The battery in which the hydrogen storage alloy negative electrode c was used and the electrolyte was poured so as to be 85 mg per gram of the hydrogen storage alloy was regarded as the battery C. The battery in which the hydrogen storage alloy negative electrode d was used and the electrolyte was poured so as to be 85 mg per gram of the hydrogen storage alloy was regarded as the battery D.

The battery in which the hydrogen storage alloy negative electrode a was used and the electrolyte was poured so as to be 95 mg per gram of the hydrogen storage alloy was regarded as the battery E. The battery in which the hydrogen storage alloy negative electrode b was used and the electrolyte was poured so as to be 95 mg per gram of the hydrogen storage alloy was regarded as the battery F. The battery in which the hydrogen storage alloy negative electrode c was used and the electrolyte was poured so as to be 95 mg per gram of the hydrogen storage alloy was regarded as the battery G. The battery in which the hydrogen storage alloy negative electrode d was used and the electrolyte was poured so as to be 95 mg per gram of the hydrogen storage alloy was regarded as the battery H. The battery in which the hydrogen storage alloy negative electrode b was used and the electrolyte was poured so as to be 125 mg per gram of the hydrogen storage alloy was regarded as the battery I.

The electrolyte amount (Z1 (mg)) per gram of the hydrogen storage alloy was calculated as follows: the hydrogen storage alloy negative electrode 11 was taken out from each of the nickel-hydrogen storage batteries 10 (A, B, C, D, E, F, G, H, and I), immersed in running water for dealkalization, and dried under vacuum; and the mass difference before and after the washing was divided by the mass of the hydrogen storage alloy. The alkaline electrolyte amount (P1 (mg)) contained in the separator was calculated as follows: the separator 13 was taken out from each of the nickel-hydrogen storage batteries 10 (A, B, C, D, E, F, G, H, and I), immersed in running water for dealkalization, and dried under vacuum; and the mass difference before and after the washing was divided by the mass of the separator.

6. Battery Test (1) Activation

Each of the nickel-hydrogen storage batteries 10 (A, B, C, D, E, F, G, H, and I) prepared as above was charged in a temperature environment of 25° C. at a charging current of 1 It until the voltage reached a state of charge (SOC) of 120%, and left for 1 hour. Next, the battery was left in a temperature environment of 60° C. for 24 hours, and then discharged in a temperature environment of 30° C. at a discharging current of 1 It until the battery voltage reached 0.9 V. Such cycle was repeated 2 cycles to activate each of the nickel-hydrogen storage batteries 10 (A, B, C, D, E, F, G, H, and I).

(2) Evaluation of Discharge Power and Amount of Lifetime Work (Total Output Time after Discharge for 3000 Hours in Partial Charge and Discharge Cycles)

Next, each of the activated nickel-hydrogen storage batteries 10 (A, B, C, D, E, F, G, H, and I) was charged at a charging current of 10 It in a temperature environment of 45° C. (the battery temperature was 45° C.) until the voltage reached an SOC of 80% with respect to the initial battery capacity, and then discharged at a discharging current of 10 It until the voltage reached 20% of SOC. Such charge and discharge cycle was repeated for a partial charge and discharge cycle test. Then, after discharge for 500 hours and 3000 hours in such partial charge and discharge cycles (the 500 hours and 3000 hours correspond to 1000 hours and 6000 hours in the partial charge and discharge cycles, respectively), and the discharge power (W) at 25° C. of each battery was determined. The results are shown in Table 2.

In this case, the discharge power (W) at 25° C. was determined as follows: a battery was charged at 25° C. at a charging current of 1.0 It up to 50% of the battery capacity (nominal capacity), and left in a temperature environment of 25° C. for 3 hours; then, the battery was discharged at a discharge rate of 30 It for 10 seconds; and the product of the battery voltage (V) after discharge for 10 seconds and the current (A) was regarded as the discharge power (W). In Table 2, the initial power (W) of the battery A is regarded as 100, and each initial power (W) of the other batteries is represented by the ratio (%) to that of the battery A. Each discharge power (W) after 500 and 3000 hours is also represented by the ratio (%) to the initial power (W) of the battery A.

Figure 2:
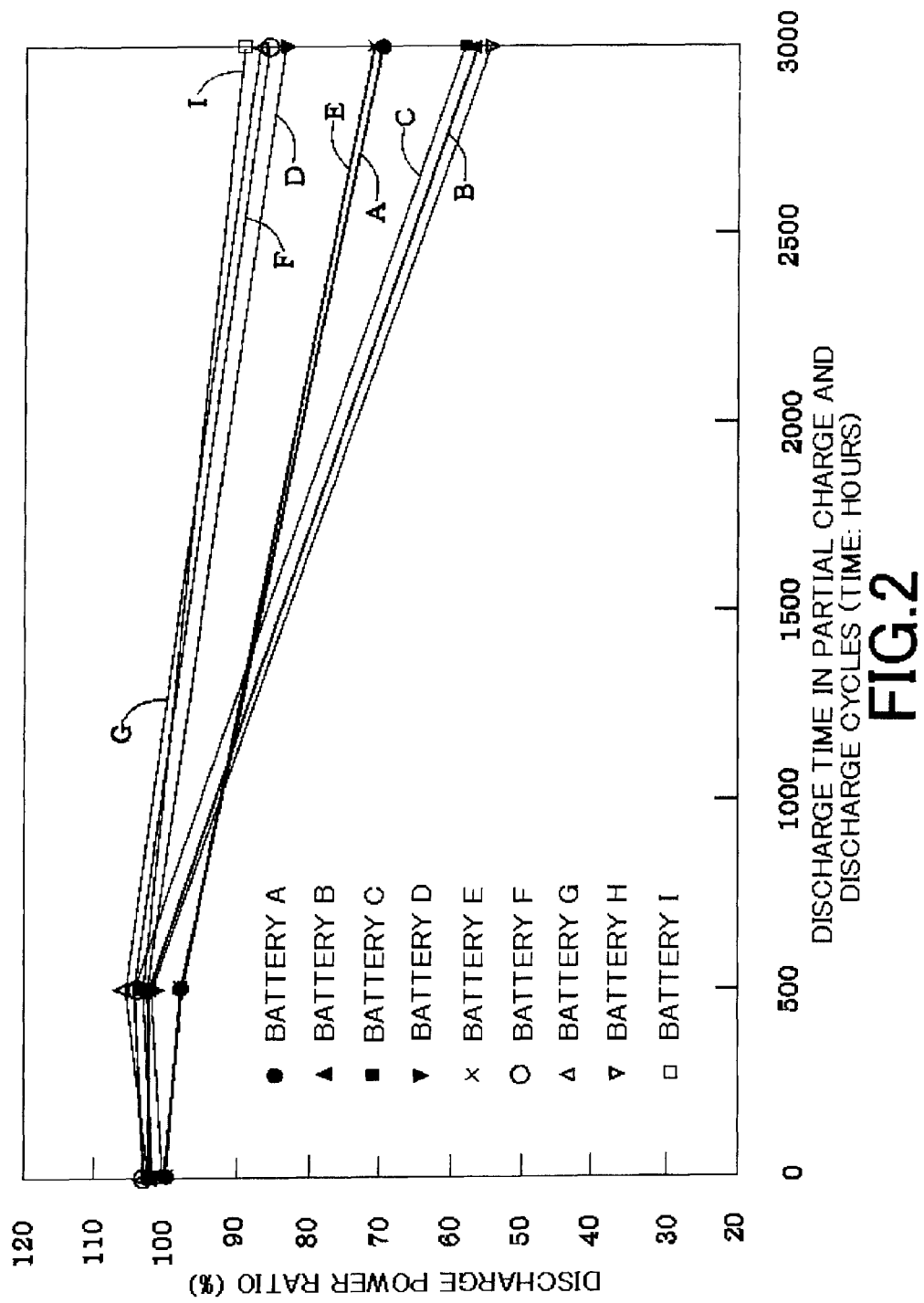
FIG. 2 is a graph showing relations of the ratio of discharge power (W) with respect to the elapsed time (time: hours) in partial charge and discharge cycles.

Next, the area under the straight line between the discharge powers (W) after discharge for 500 and 3000 hours (Wh: the area under each curve in FIG. 2) was defined as the amount of lifetime work (total power after discharge for 3000 hours in partial charge and discharge cycles) (Wh), and the ratio (%) of the amount of lifetime work (Wh) of each battery to that of the battery A was calculated as listed in Table 2. Based on the results in Table 2, each discharge time (time: hours) in the partial charge and discharge cycles was plotted on the horizontal axis (X axis), each ratio (%) of the output power (W) corresponding to the discharge time (time: hours) with respect to that of the battery A was plotted on the vertical axis (Y axis), and as a result, the graph was obtained as shown in FIG. 2.

After discharge for 3000 hours in the partial charge and discharge cycles, the negative electrode sheet 11 was taken out from each of the nickel-hydrogen storage batteries 10 (A, B, C, D, E, F, G, H, and I), immersed in running water for dealkalization, and dried under vacuum. Then, the mass difference before the washing and after the drying was divided by the mass of the hydrogen storage alloy (removing CMC, SBR, and Ketjenblack) to determine the electrolyte retention amount (Z2 (mg)) per gram of the hydrogen storage alloy. The obtained results are shown in Table 2.

As for the alkaline electrolyte included in the separator, the separator 13 was taken out from each of the nickel-hydrogen storage batteries 10 (A, B, C, D, E, F, G, H, and I), immersed in running water for dealkalization, and dried under vacuum. The mass difference before and after the washing was divided by the mass of the separator to determine the electrolyte retention amount (P2 (mg)) per gram of the separator. The obtained results are shown in Table 2.

TABLE 2

| Type of Ni-hydrogen storage battery | Type of hydrogen storage alloy | Electrolyte retention amount (mg) per gram of alloy | | Electrolyte retention amount (mg) per gram of separator | | Discharge power ratio after charge and discharge (initial power of battery A: 100) (%) | | | Ratio of amount of lifetime work (amount of lifetime work of battery A: 100) (%) |
|---|---|---|---|---|---|---|---|---|---|
| | | Before charge and discharge (Z1) | After 3000 hours (Z2) | Before charge and discharge (P1) | After 3000 hours (P2) | Before charge and discharge (initial stage) | After 500 hours | After 3000 hours | |
| A | α | 85 | 55 | 540 | 250 | 100 | 98 | 70 | 100 |
| B | β | 85 | 49 | 535 | 225 | 102 | 102 | 57 | 96 |
| C | γ | 85 | 51 | 535 | 230 | 103 | 104 | 58 | 98 |
| D | δ | 85 | 47 | 540 | 225 | 103 | 102 | 55 | 96 |
| E | α | 95 | 64 | 655 | 380 | 100 | 98 | 71 | 100 |
| F | β | 95 | 65 | 665 | 375 | 103 | 104 | 86 | 111 |
| G | γ | 95 | 67 | 660 | 375 | 103 | 106 | 87 | 113 |
| H | δ | 95 | 67 | 670 | 370 | 103 | 103 | 84 | 111 |
| I | β | 125 | 87 | 1160 | 925 | 101 | 103 | 89 | 112 |

7. Test Result

The results in Table 2 and FIG. 2 reveal the followings.

Specifically, first, it is clear that the batteries B, C, and D that included the hydrogen storage alloys β, γ, and δ, respectively, in place of the hydrogen storage alloy α (m=0.25, m>0.22) in the negative electrode 11 in the battery A had improved output powers at the initial stage and after 500 hours. This is thought to be because the small Al content (m=0.15, m=0.10, or m=0.06, namely, 0.06≤m≤0.22) in each of the hydrogen storage alloys β, γ, and δ accelerated the pulverization of the alloy that provides an advantage for the output from the initial stage in partial charge and discharge.

In this case, in each of the hydrogen storage alloys β, γ, and δ, the Al concentration ratio (X) in the surface layer was reduced to 0.36 to 0.85 (0.36≤X/Y≤0.85) with respect to the Al concentration ratio (Y) in the bulk layer by the surface treatment with disodium hydrogen phosphate dodecahydrate.

Therefore, the amount of Al eluted from the hydrogen storage alloy negative electrode into an alkaline electrolyte was suppressed.

It is clear that each amount of lifetime work was improved by 10% or more as compared with that of the battery A in the batteries F, G, H, and I that used the hydrogen storage alloy β, γ, or δ for the negative electrode and in which the electrolyte retention amount (Z1) was increased from 85 mg to 95 mg or to 125 mg per gram of the alloy. This is thought to be because the increase of the electrolyte retention amount (Z1) from 95 mg to 125 mg per gram of the alloy suppressed oxidation on the alloy surface after the progress of the pulverization of hydrogen storage alloy in the initial stage in the partial charge and discharge cycles and consequently the amount of lifetime work could be increased. This is a large improvement effect on the amount of lifetime work as compared with the related art hydrogen storage alloy α (m=0.25, m>0.22). In other words, the pulverization is advanced in the initial stage in the partial charge and discharge cycles to improve the output power in the initial stage in the partial charge and discharge cycles while the surface condition of the hydrogen storage alloy is maintained to greatly improve the amount of lifetime work than ever.

However, it is clear that the battery E that included an electrolyte in an increased retention amount (Z1) of 95 mg per gram of the alloy but that included the hydrogen storage alloy α having a high Al content (m=0.25, m>0.22) for the negative electrode had no improvement in the amount of lifetime work, unlike the battery F and battery G, and had substantially the same amount of lifetime work as that of the battery A. This is thought to be because the hydrogen storage alloy α was not pulverized to a large extent in the initial stage of partial charge and discharge cycles, but was gradually pulverized as compared with the hydrogen storage alloys β, γ, and δ. In this case, the battery had an increased electrolyte retention amount (Z1) per gram of alloy, but the pulverization gradually generated a new surface on the alloy, and consequently the elution of Al and the like from the new surface was supposed to be accelerated to reduce the effect.

From the foregoing results, the amount of lifetime work can be greatly improved when the composition formula is $La_xRe_yMg_{1-x-y}Ni_{n-m-v}Al_mT_v$ (where Re is at least one element selected from among rare earth elements including Y (other than La), T is at least one element selected from among Co, Mn, and Zn, $0.17 \leq x \leq 0.64$, $3.5 \leq n \leq 3.8$, $0.06 \leq m \leq 0.22$, and $v \geq 0$), the main phase has the $A_5B_{19}$ type crystal structure, the negative electrode employs a hydrogen storage alloy having the ratio X/Y of the concentration ratio X of aluminum (Al) to nickel (Ni) in the surface layer and the concentration ratio Y of aluminum (Al) to nickel (Ni) in the bulk layer of 0.36 or more and 0.85 or less ($0.36 \leq X/Y \leq 0.85$), partial charge and discharge control is performed, and the alkaline electrolyte amount retained in the alkaline storage battery satisfies a condition of 95 mg or more and 125 mg or less per gram of the hydrogen storage alloy before partial charge and discharge cycles.

It is preferable that the retention amount of the alkaline electrolyte be 660 mg or more and 1160 mg or less ($660 \text{ mg} \leq P1 \leq 1160 \text{ mg}$) per gram of the separator at this time.

In this case, if the electrolyte amount is controlled so that the remaining electrolyte retention amount (Z2) will be 65 mg or more per gram of the alloy after discharge for 3000 hours in partial charge and discharge cycles, the amount of lifetime work will improve. This reveals that the electrolyte amount is preferably controlled so that the electrolyte retention amount (Z2) will be 65 mg or more per gram of the alloy after discharge for 3000 hours. Furthermore, the electrolyte amount is preferably controlled so that the electrolyte retention amount (P2) will be 370 mg or more per gram of the separator at this time.

Here, a discharge of 3000 hours in partial charge and discharge cycles (corresponding to 6000 hours in partial charge and discharge cycles) corresponds to a travel time of 10 years or more or a travel distance of 150,000 km or more of a vehicle.

It is preferable that the element T that is replaced with nickel in the hydrogen storage alloy include no cobalt (Co) or manganese (Mn). This is because applications in, for example, HEVs that are left in a high temperature environment for a long time require self-discharge characteristics, but Co or Mn contained in the negative electrode is eluted during long time leaving and is reprecipitated on the separator to reduce the self-discharge characteristics.

In an alkaline storage battery system including the hydrogen storage alloy of the invention, it is preferable that charging and discharging can be controlled within an SOC from 20 to 80%. It is preferable that the partial charge and discharge control stop the discharging and start the charging when the voltage reaches an SOC of 20%, and the partial charge and discharge control stop the charging and start the discharging when the voltage reaches an SOC of 80%. Such control can effectively provide the advantages of the invention. Furthermore, the charging and discharging can be preferably controlled within an SOC of from 30 to 70%, and more preferably, the charging and discharging can be controlled within that form 40 to 60%.

What is claimed is:

1. An alkaline storage battery comprising:
an electrode group including a hydrogen storage alloy negative electrode including negative electrode active material of a hydrogen storage alloy, a nickel positive electrode including positive electrode active material mainly containing nickel hydroxide, and a separator; an alkaline electrolyte; and an outer can housing the electrode group and the alkaline electrolyte,
the hydrogen storage alloy including a composition expressed by $La_xRe_yMg_{i-x-y}Ni_{n-m-v}Al_mT_v$, where Re is at least one element selected from the group consisting of rare earth elements including Y and other than La,
T is at least one element selected from the group consisting of Co, Mn, and Zn,
$0.17 \leq x \leq 0.64$, $0.1 \leq 1-x-y \leq 0.2$, $3.5 \leq n \leq 3.8$, $0.06 \leq m \leq 0.22$, and $v \geq 0$, and has a main phase of an $A_5B_{19}$ type crystal structure, and
a ratio of X/Y of the concentration ratio where X is Al/Ni % of aluminum to nickel in a surface layer and the concentration ratio where Y is Al/Ni % of aluminum to nickel in a bulk layer being 0.36 or more and 0.85 or less, and
the hydrogen storage alloy negative electrode retaining the alkaline electrolyte in a retention amount, Z1, of 95 mg $\leq$ Z1 $\leq$ 125 mg per gram of the hydrogen storage alloy.

2. The alkaline storage battery according to claim 1, wherein the separator retains the alkaline electrolyte in a retention amount, P1, of 660 mg $\leq$ P $\leq$ 1160 mg per gram of the separator.

3. The alkaline storage battery according to claim 1, wherein the hydrogen storage alloy negative electrode retains the alkaline electrolyte in a retention amount, Z2, of 65 mg or more per gram of the hydrogen storage alloy after discharge for 3000 hours in partial charge and discharge cycles of the alkaline storage battery.

4. The alkaline storage battery according to claim 1, wherein the separator retains the alkaline electrolyte in a retention amount, P2, of 370 mg or more per gram of the separator after discharge for 3000 hours in partial charge and discharge cycles of the alkaline storage battery.

5. An alkaline storage battery system comprising:
an alkaline storage battery that comprises an electrode group including a hydrogen storage alloy negative electrode including negative electrode active material of a hydrogen storage alloy, a nickel positive electrode including positive electrode active material mainly containing nickel hydroxide, and a separator; an alkaline electrolyte; and an outer can housing the electrode group and the alkaline electrolyte; and
a partial charge and discharge control apparatus; wherein the hydrogen storage alloy includes a composition expressed by

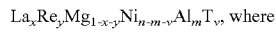

$La_xRe_yMg_{1-x-y}Ni_{n-m-v}Al_mT_v$, where

Re is at least one element selected from the group consisting of rare earth elements including Y and other than La, T is at least one element selected from the group consisting of Co, Mn, and Zn, $0.17 \leq x \leq 0.64$, $0.1 \leq 1-x-y \leq 0.2$, $3.5 \leq n \leq 3.8$, $0.06 \leq m \leq 0.22$, and $v \geq 0$, and has a main phase of an $A_5B_{19}$ type crystal structure, a ratio of X/Y of the concentration ratio where X is Al/Ni % of aluminum to nickel in a surface layer and the concentration ratio where Y is Al/Ni % of aluminum to nickel in a bulk layer being 0.36 or more and 0.85 or less, the partial charge and discharge control apparatus performing such control that the alkaline storage battery is charged and discharged only within a state of charge, SOC, from 20 to 80% and the hydrogen storage alloy negative electrode retaining the alkaline electrolyte in a retention amount, Z1, of 95 mg$\leq$Z1$\leq$125 mg per gram of the hydrogen storage alloy.

6. The alkaline storage battery system according to claim 5, wherein the partial charge and discharge control apparatus stops discharging and starts charging when the voltage reaches an SOC of 20%, and the partial charge and discharge control apparatus stops charging and starts discharging when the voltage reaches an SOC of 80%.

\* \* \* \* \*